United States Patent [19]

Stolz et al.

[11] 4,285,316

[45] Aug. 25, 1981

[54] FUEL SYSTEM FOR A MOTOR VEHICLE

[75] Inventors: Albert Stolz, Tübingen; Erich Thiel, Esslingen; Volker Bochenek, Denkendorf; Roland Stoklassa, Nürtingen, all of Fed. Rep. of Germany

[73] Assignee: Daimler-Benz Aktiengesellschaft, Stuttgart, Fed. Rep. of Germany

[21] Appl. No.: 76,816

[22] Filed: Sep. 19, 1979

[30] Foreign Application Priority Data

Sep. 23, 1978 [DE] Fed. Rep. of Germany ....... 2841557

[51] Int. Cl.³ ............................................ F02M 31/20
[52] U.S. Cl. .................................. 123/514; 123/510; 123/541
[58] Field of Search ............... 123/540, 557, 541, 542, 123/41.31, 510, 514, 142.5; 180/54 A, 54 B

[56] References Cited

U.S. PATENT DOCUMENTS

| | | | |
|---|---|---|---|
| 1,622,498 | 3/1927 | Dunn | 180/54 A |
| 2,885,865 | 5/1959 | Muenger | 123/540 |
| 3,973,536 | 8/1976 | Zelders | 123/541 |

Primary Examiner—Ronald H. Lazarus
Attorney, Agent, or Firm—Craig and Antonelli

[57] ABSTRACT

A fuel system for a motor vehicle with a passenger space and driven by an internal combustion engine that includes a fuel tank, a fuel feed pump, a mixture-producing device, a fuel inlet line leading from the fuel tank to the fuel feed pump and a fuel return line leading back to the fuel tank, and a liquid/air heat-exchanger arranged in the fuel system which is traversed on the liquid side by the fuel and on the air side by the ventilating discharge air out of the passenger space.

23 Claims, 3 Drawing Figures

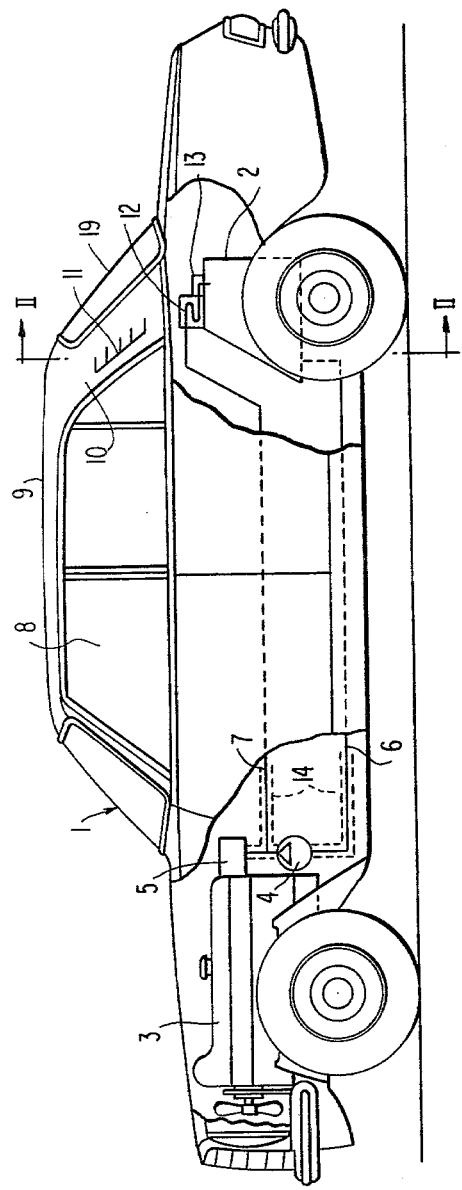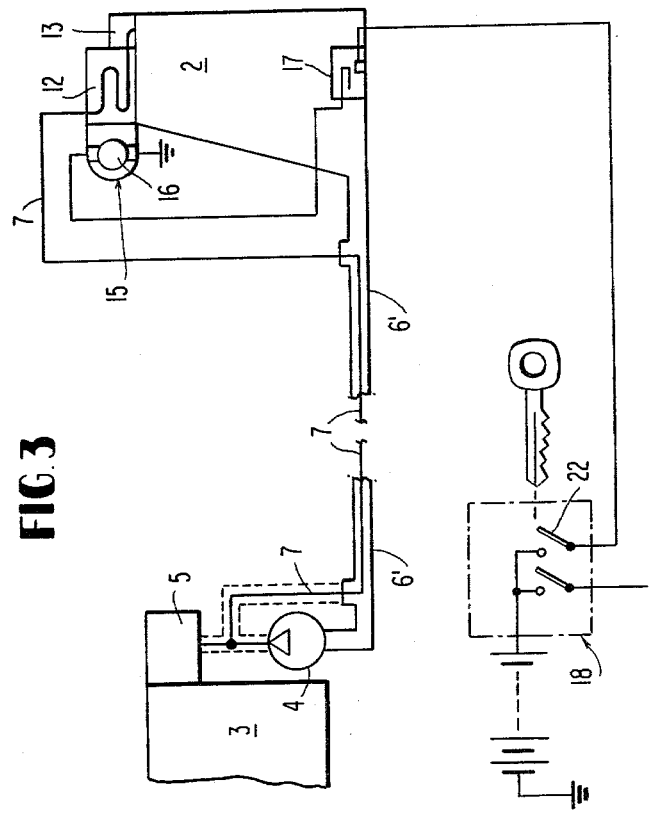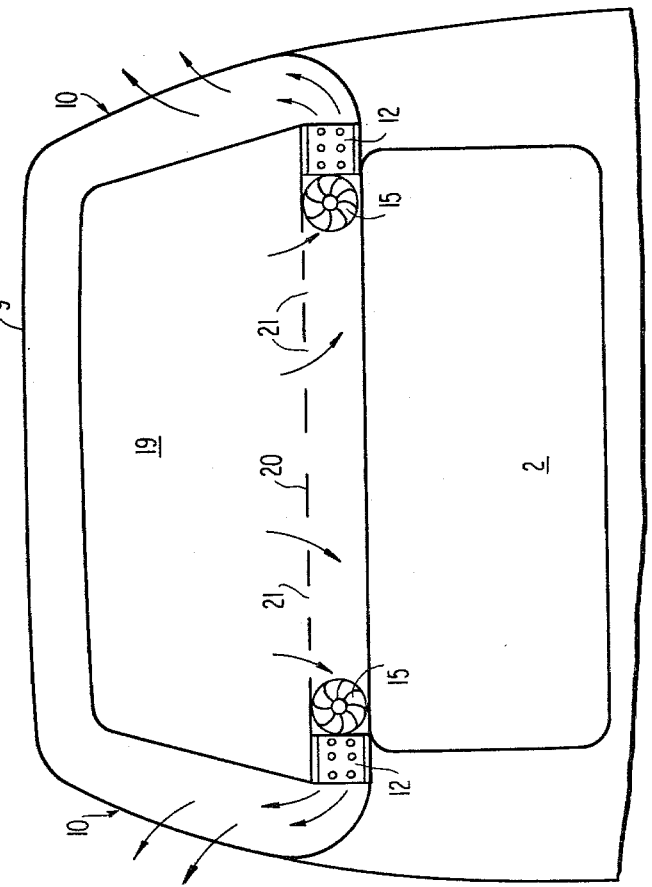

FUEL SYSTEM FOR A MOTOR VEHICLE

The present invention relates to a fuel system for a motor vehicle driven by an internal combustion engine with a fuel tank, a fuel feed pump, a mixture-producing device as well as a fuel inlet line and fuel return line. Such types of fuel systems are used for Otto engines, especially for those with an injection system for the mixture preparation. With injection engines, a constant system pressure, for example, 5 bar must be present in the fuel ahead or upstream of the mixture-producing device, which must be built-up by the fuel feed pump and must be maintained by a pressure regulator. The feed output of the fuel feed pump is higher than the fuel need of the internal combustion engine at full load; the fuel quantity which is not needed is conducted back into the tank by way of a return line. The return quantity is approximately 0.8 to 1.8 times the full load consumption quantity in fuel.

The constant circulation of fuel through the hot engine space and the flow resistances within the fuel system as well as the lost friction work of the fuel pump will lead to a heat-up of the fuel. As a result thereof, the content of the tank may heat up to above 50° C. during summer or tropical outside temperatures. It is thereby disadvantageous that the readily boiling components of the Otto fuel commence to boil, escape into the environment and thereby not only cause an environmental burdening but additionally represent an unnecessary loss in fuel energy. With closed fuel systems which include an absorption installation for the temporary absorption of smaller fuel vapor quantities, a much larger quantity of fuel vapor appears in the absorption installation at high outside temperatures than the same is capable of absorbing. Fuel vapor which no longer can be absorbed then flows into an installation for the after-burning of non-combusted fuel components. As a result of these additional fuel components to be oxidized, the afterburners may be overheated and destroyed. Apart from these useless and therefore unnecessary fuel consumptions, a very high fuel temperature also causes disturbances in the mixture-producing devices which operate according to the principle of the fuel injection, because the fuel can no longer be sucked-in free of bubbles due to dropping below the partial vapor pressure, and, consequently, the fuel also cannot be injected free of bubbles.

With vehicles which are equipped with an air-conditioning system with an air-conditioning apparatus, one has cooled down also the fuel by way of this air-conditioning apparatus. However, it is disadvantageous in connection therewith that the air-conditioning apparatus has to be designed at the outset to an increased air-conditioning output, as a result of which it becomes altogether heavier and the driving power necessary therefor becomes larger; consequently, more fuel is used indirectly for cooling the fuel than without fuel re-cooling. This type of heat removal is therefore uneconomical and as to the rest is limited to those vehicles which have an air-conditioned interior space.

It is the aim of the present invention to improve the fuel system of the type in question to the extent that an economic re-cooling of the fuel is possible also without the prerequisite of an artificial air-conditioning of the passenger space.

The underlying problems are solved according to the present invention in that an air/liquid heat-exchanger is arranged in the fuel system which is traversed on the liquid side by the fuel and on the air side by ventilating discharge air out of the passenger space.

The passenger space—whether with or without an air-conditioning installation—is the area of a motor vehicle which is warmed-up or heated-up the least, and the space discharge air escaping out of the passenger space can be utilized usefully for cooling purposes. The advantages of this proposal in comparison to the aforementioned fuel re-cooling are as follows: This type of re-cooling is able to get along in principle also without an air-conditioning installation. If, however, an air-conditioning installation is provided, the latter has to be designed as regards its power output exclusively for the air-conditioning of the passenger space. The expenditures for the re-cooling proposed herein are therefore less than with a re-cooling by means of an air-conditioning aggregate. No additional aggregates need to be arranged in the engine space which is already quite constricted as regards the space conditions. The individual elements for the fuel re-cooling system according to the present invention are not located in the engine space but are located in the most safe part of the vehicle above the rear axle thereof. The heat-exchanger between cooling medium and fuel which is necessary with a re-cooling of the fuel by means of an air-conditioning aggregate and which is not completely non-dangerous, can be dispensed with; in case of a defect, a mixing of cooling medium and of fuel can no longer occur.

Accordingly, it is an object of the present invention to provide a fuel system for a motor vehicle which avoids by simple means the aforementioned shortcomings and drawbacks encountered in the prior art.

Another object of the present invention resides in a fuel system for a motor vehicle in which a substantial heating-up of the fuel is effectively minimized. A further object of the present invention resides in a fuel system for a motor vehicle which is more favorable to the environmental protection as regards fuel components with low boiling points that might readily escape into the atmosphere in case of a heat-up of the fuel.

A still further object of the present invention resides in a fuel system for internal combustion engines in which the catalytic converters or afterburners, intended to burn off the non-combusted components in the exhaust of the engine, are effectively protected against damage and destruction due to an excess of non-combusted evaporated fuel components in the exhaust.

Another object of the present invention resides in a fuel system for internal combustion engines which not only assures proper operation of the mixture-producing device under all conditions but which additionally improves the efficiency of the system, yet eliminates the danger of the inclusion of air bubbles in the fuel, harmful in particular in connection with injection systems.

A further object of the present invention resides in a fuel system for motor vehicles in which the air-conditioning system need not be designed to provide for re-cooling of the fuel.

Still another object of the present invention resides in a fuel system for motor vehicles which is not dependent on the presence of an air-conditioning system in the motor vehicle.

Another object of the present invention resides in a fuel system for motor vehicles which achieves all of the aforementioned aims and objects, yet is simple in construction and relatively low in cost as regards original installation and servicing.

Still another object of the present invention resides in a fuel system of the type described above which is so constructed and arranged as to be safe to a high degree in case of rear-end collisions and, at the same time, safeguards the system against the mixing of fuel with a cooling medium.

These and other objects, features and advantages of the present invention will become more apparent from the following description when taken in connection with the accompanying drawing which shows, for purposes of illustration only, two embodiments in accordance with the present invention, and wherein:

FIG. 1 is a somewhat schematic side elevational view of a motor vehicle with a fuel system in accordance with the present invention;

FIG. 2 is a partial schematic cross-sectional view through the vehicle of FIG. 1, taken along line II—II; and FIG. 3 is a schematic view of the electrical control for the exhaust fans as used in a slightly modified version of the fuel system according to the present invention.

Referring now to the drawing wherein like reference numerals are used throughout the various views to designate like parts, and more particularly to FIG. 1, the motor vehicle generally designated by reference numeral 1 and illustrated in this figure is driven by an internal combustion engine 3, which receives its fuel from the fuel tank 2. An excess amount of fuel is fed to the internal combustion engine 1, respectively, the mixture-producing device 5 thereof by the fuel feed pump 4 by way of the fuel inlet line 6. The fuel quantity which is not used up by the internal combustion engine 1 flows back to the fuel tank 2 by way of the fuel return line 7. For purposes of shielding the fuel lines 6 and 7 against heat influence, these fuel lines 6 and 7 are provided with a heat insulation 14 at least in the neighborhood of the engine space.

The fuel tank 2 is arranged in an impact-safe area between the passenger space 8 and the rear portion of the vehicle serving as squeeze or collapse zone. The passenger space 8 may be ventilated in its forward area; a ventilation discharge takes place by way of the outer ventilating discharge openings 11 which are arranged in the illustrated embodiment in the rear lateral girders 10 that delimit the rear windowpane 19 on both sides thereof and carry the roof 9 in its rear area. The fuel tank 2, in the illustrated arrangement, is located below the so-called hat deposit or storage shelf 20 (FIG. 2), by means of which the horizontal surface below the rear window 19 is to be designated. For keeping the rear windowpane 19 free of precipitation, inner ventilating discharge openings 21 may be provided in the hat storage shelf or in a fold within the area near the rear window; the discharge openings 21 are thereby in communication by way of air conduction channels with the outer air ventilating discharge openings 11 in the lateral girders 10.

The continuous circulation of fuel in the illustrated circulatory system, the heat influence from the engine space, and the constant throttling of the circulating fuel by a pressure control valve will lead to a warm-up of the fuel which, during summer or tropical outside temperatures, may exceed dangerous peak values insofar as countermeasures are not taken. A heat-exchanger 12 is provided according to the present invention for re-cooling the fuel to the permissive temperatures, which is constructed as air/liquid heat-exchanger and which is traversed on the liquid side by the fuel and on the air side by the passenger space discharge air. The heat-exchanger 12 is arranged in the return line 7 in proximity of the fuel tank 2. The return line 7 represents the warmest place within the described circulation of the fuel. The proximity to the fuel tank 2 is conditioned, on the one hand, by the fact that the discharge air of the passenger space is discharged out of the passenger space from the rear portion thereof.

The pressure regulator or controller 13 which has already been mentioned hereinabove, is also arranged in the return line 7 and more particularly downstream of the heat-exchanger 12 directly at the wall of the fuel tank 2 and at the inflow place of the fuel return line 7 into the tank. The arrangement of the pressure regulating device 13 in proximity to the tank 2 offers the advantage that in case of condition changes occurring as a result of a throttling-down of the fuel from the system pressure to the atmospheric pressure, for example, evaporations, the bindings of heat energy connected therewith are removed from the fuel disposed in the tank and are not additionally absorbed from the heat of the engine space.

In order to be able to assure an adequate re-cooling of the fuel also with slight temperature drops, a ventilating discharge fan generally designated by reference numeral 15 adapted to be driven by an electric motor 16 is provided in the illustrated embodiment with each of the heat-exchangers arranged on both sides of the vehicle; the fan 15 is able to positively feed space discharge air through the heat-exchangers into the atmosphere. The fan 15 may be turned on and off automatically as a function of temperature by means of a temperature-sensitive switch 17 arranged in the tank 2. In order to assure that the fan 15 can be set into operation only when the ignition is turned on, an additional switch 22 is additionally combined with the ignition lock 18 which enables also the power supply for the fan 15.

Since the fuel in the return line is warmer by reason of the heat-up in the engine space which cannot be altogether avoided, than the inflowing fuel in the inlet line 6 coming from the fuel tank 2, a modification is provided in the embodiment according to FIG. 3 for increasing the re-cooling in which the return line 7 is arranged concentrically on the inside of the inlet line 6' and operates in this manner according to the counterflow principle as extended pipe cooler.

While we have shown and described only two embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A fuel system for a motor vehicle driven by an internal combustion engine, comprising fuel tank means, fuel feed pump means, mixture-producing means, inlet line means leading from the fuel tank to the fuel pump means, return line means for excess fuel leading back to the fuel tank means, and a passenger space on the vehicle adapted to be closed and operable to be ventilated, characterized in that an air/liquid heat-exchanger means is provided in the fuel system which is traversed on the liquid side by the fuel and on the air side by the ventilating discharge air out of the passenger space.

2. A fuel system according to claim 1, characterized in that the heat-exchanger means is arranged at least in close proximity to the warmest place of the circulatory system which is formed by the tank means, the inlet line means, the feed pump means, the mixture-producing means and the return line means.

3. A fuel system according to claim 2, characterized in that the heat-exchanger means is located at the warmest place of said circulatory system.

4. A fuel system according to claim 1, 2, or 3, characterized in that the heat-exchanger means is arranged in the return line means.

5. A fuel system according to claim 2, characterized in that the heat-exchanger means is arranged closely upstream of the discharge place of the return line means into the tank means.

6. A fuel system according to claim 1, 2, 3, or 5, with a pressure regulator means for maintaining a substantially constant fuel pressure in the line section between the feed pump means and the pressure regulator means, said pressure regulator means being arranged downstream of the feed pump means, characterized in that the pressure regulator means is arranged in the return line means.

7. A fuel system according to claim 6, characterized in that the pressure regulator means is arranged downstream of the heat-exchanger means.

8. A fuel system according to claim 6, characterized in that the pressure regulator means is arranged in wall means of the tank means at the discharge place of the return line means.

9. A fuel system according to claim 8, characterized in that the heat-exchanger means is arranged closely upstream of the discharge place of the return line means into the tank means.

10. A fuel system according to claim 8, characterized in that at least one of inlet line means and return line means is at least partially heat-insulated.

11. A fuel system according to claim 10, characterized in that the return line means extends at least within sections substantially concentrically on the inside of the inlet line means.

12. A fuel system according to claim 10, characterized in that a fan means is arranged at the heat-exchanger means on the air side thereof.

13. A fuel system according to claim 12, characterized in that a temperature-sensitive switch means is arranged in the fuel which automatically turns on and off the power supply for the fan means in dependence on the temperature.

14. A fuel system according to claim 13, characterized in that the temperature-sensitive switch means is arranged in the tank means.

15. A fuel system according to claim 14, characterized in that a further switch means is arranged in the power supply for the fan means which permits a turning on of the fan means only with an engaged ignition.

16. A fuel system according to claim 15, characterized in that the further switch means is actuated at least indirectly along with an ignition lock of the motor vehicle.

17. A fuel system according to claim 1, 2, 3 or 5, characterized in that at least one of inlet line means and return line means is at least partially heat-insulated.

18. A fuel system according to claim 1, 2, 3, or 5, characterized in that the return line means extends at least within sections substantially concentrically on the inside of the inlet line means.

19. A fuel system according to claim 1, 2, 3 or 5, characterized in that a fan means is arranged at the heat-exchanger means on the air side thereof.

20. A fuel system according to claim 19, characterized in that a temperature-sensitive switch means is arranged in the fuel which automatically turns on and off the power supply for the fan means in dependence on the temperature .

21. A fuel system according to claim 20, characterized in that the temperature-sensitive switch means is arranged in the tank means.

22. A fuel system according to claim 20, characterized in that a further switch means is arranged in the power supply for the fan means which permits a turning on of the fan means only with an engaged ignition.

23. A fuel system according to claim 22, characterized in that the further switch means is actuated at least indirectly along with an ignition lock of the motor vehicle.

* * * * *